(12) United States Patent
Fratini et al.

(10) Patent No.: US 10,821,383 B2
(45) Date of Patent: Nov. 3, 2020

(54) MULTI-PHASE PUMPING SYSTEM WITH SELF-PURGING FILTRATION

(71) Applicant: Flowserve Management Company, Irving, TX (US)

(72) Inventors: Alejandro Fratini, Buena Park, CA (US); Jelenko Krsmanovic, Kitchener (CA); Carlos Reyes, Los Angeles, CA (US); William Tang, Villa Park, CA (US)

(73) Assignee: Flowserve Management Company, Irving, TX (US)

( * ) Notice: Subject to any disclaimer, the term of this patent is extended or adjusted under 35 U.S.C. 154(b) by 303 days.

(21) Appl. No.: 15/772,190

(22) PCT Filed: Nov. 2, 2016

(86) PCT No.: PCT/US2016/059986
§ 371 (c)(1),
(2) Date: Apr. 30, 2018

(87) PCT Pub. No.: WO2017/079197
PCT Pub. Date: May 11, 2017

(65) Prior Publication Data
US 2018/0311598 A1 Nov. 1, 2018

Related U.S. Application Data

(60) Provisional application No. 62/249,530, filed on Nov. 2, 2015.

(51) Int. Cl.
*B01D 37/04* (2006.01)
*F04C 2/16* (2006.01)
(Continued)

(52) U.S. Cl.
CPC .............. *B01D 37/04* (2013.01); *B01D 29/52* (2013.01); *B01D 29/66* (2013.01); *B01D 35/26* (2013.01);
(Continued)

(58) Field of Classification Search
CPC ........ B01D 29/52; B01D 29/66; B01D 35/12; B01D 35/26; B01D 37/04; F04C 2280/02; F04C 29/0092; F04C 2/16
(Continued)

(56) References Cited

U.S. PATENT DOCUMENTS 5,772,879 A 6/1998 Jaikaran
2007/0221413 A1 9/2007 Sims et al.
2013/0180901 A1 7/2013 Brull

FOREIGN PATENT DOCUMENTS

DE 3100016 A1 1/1982
GB 2066688 A * 7/1981 ............. B01D 36/02
WO 9503870 A1 2/1995

OTHER PUBLICATIONS

International Preliminary Report on Patentability for Appl PCT/US2016/059986 dated May 8, 2018, 12 pages.
(Continued)

*Primary Examiner* — Terry K Cecil
(74) *Attorney, Agent, or Firm* — Maine Cernota & Rardin

(57) ABSTRACT

An apparatus and method prevent entrained solids from entering a pump by directing a process stream through an active upstream filter that removes the solids, and then through a downstream idle filter where the process stream purges the filter of previously retained solids. The flow path is periodically switched to exchange the roles of the filters, so that none of the filters is saturated, and the solids remain in the process flow but bypass the pump. Any need for a low pressure destination for purged solids and purging fluid and/or any environmental impact of dumping process fluid
(Continued)

and solids into the environment is thereby avoided. Partially opened valves can be used to divert only part of the downstream flow for filter purging. Selectable paths can be included for which no filters are purged. The downstream flow can be divided and used to simultaneously purge a plurality of idle filters.

20 Claims, 7 Drawing Sheets

(51) Int. Cl.
    *B01D 35/26*    (2006.01)
    *B01D 29/52*    (2006.01)
    *B01D 29/66*    (2006.01)
    *F04C 29/00*    (2006.01)
    *B01D 35/12*    (2006.01)

(52) U.S. Cl.
    CPC ................ *F04C 2/16* (2013.01); *B01D 35/12* (2013.01); *F04C 29/0092* (2013.01); *F04C 2280/02* (2013.01)

(58) Field of Classification Search
    USPC ...................................................... 210/333.1
    See application file for complete search history.

(56) References Cited

OTHER PUBLICATIONS

International Search Report and Written Opinion for Appl PCT/US2016/059986 dated Feb. 23, 2017, 13 pages.
Office Action dated Apr. 14, 2020 for European Patent Appl. No. 16862820.4, 3 pages.

* cited by examiner

MULTI-PHASE PUMPING SYSTEM WITH SELF-PURGING FILTRATION

RELATED APPLICATIONS

This application is a national phase application filed under 35 USC § 371 of PCT Application No. PCT/US2016/059986 with an International filing date of Nov. 2, 2016 which claims the benefit of U.S. Provisional Application No. 62/249,530, filed Nov. 2, 2015. Each of these applications is herein incorporated by reference in its entirety for all purposes.

FIELD OF THE INVENTION

The invention relates to pumping systems, and more particularly, to pumping systems applied to process streams that include entrained solids.

BACKGROUND OF THE INVENTION

Multiphase pumps, in particular pumps that are applicable for pumping a process fluid that is a mixture of liquid, gas, and particulates have gained increased acceptance in oil field production and other applications, where they have replaced conventional production equipment with simpler and more economical technology. Multiphase pumping helps to eliminate separators, compressors, individual pumping equipment, heaters, gas flares and separate flow lines, thereby improving production at lower costs.

An additional benefit of multiphase pumps in the oil industry is the reduced environmental impact for onshore and offshore installations. Multiphase pumps require only a fraction of the space that is occupied by conventional pumping apparatus, and the ability of multiphase pumps to handle gas in a closed system instead of venting and flaring the gas guarantees low emissions and thereby protects the environment.

Twin screw multiphase pumps in particular are often used in wellhead production boosting applications, where liquid (water and oil), gas, and sand are pumped to a pipeline towards a main facility. This type of multiphase pump relies heavily on narrow clearances between the two screws and between the screws and the casing bores to maintain an acceptable volumetric efficiency, and thereby to maintain production levels.

Often, the process fluid pumped by a multi-phase pump includes large quantities of sand, and even smaller amounts of sand can be highly abrasive. The wear and damage caused by the passage through the pump of these abrasive sands can reduce the performance of the pump in a significantly short amount of time, thereby requiring frequent shutdown of the pump and replacement or repair of very expensive pump components.

Typically, under such circumstances one or two strainers are installed on the suction side of a multiphase pump to exclude large solids that could cause catastrophic damage to the pump. However, filters that would prevent the ingress of sand into the pump are usually not included, because any such filters would quickly fill with sand, and would require constant cleaning to avoid clogs that would prevent the fluid from entering the pump, possibly causing damage to other mechanisms.

Some attempts have been made to provide self-cleaning filter systems for multi-phase pumps, whereby the sand is removed from the filters automatically by periodic flushing of the filters with a flushing fluid. However, these approaches, which have not been widely used, typically require a low pressure destination for the flushing fluid and sand, which is often not available in oil and gas producing pads or clusters.

Of course, the need to protect a pump from damage due to entrained solids in a process stream is not unique to multiphase pump applications, but can arise whenever it is necessary to use a pump in a process stream that includes entrained solids that might damage the pump.

What is needed, therefore, is an apparatus and method that protects a pump from ingesting entrained solids, and is automatically purged of filtered solids without requiring a low pressure destination for purged solids and purging fluid.

SUMMARY OF THE INVENTION

An apparatus and method uses filters to protect a pump, such as a multiphase pump, from ingesting sand or other entrained solids, while automatically purging the filters of solids without requiring a low pressure destination for purged solids and purging fluid. Rather than eliminating the solids from the process stream altogether, the present apparatus and method temporarily remove the sand or other solids from the process flow upstream of the pump, and then reinject it into the process flow downstream of the pump, thereby eliminating any need for a low pressure destination for solids and purging fluid.

Note that, unless where the context requires otherwise, the term "sand" is used broadly herein to refer to any particulate, entrained solids in a process stream, and the term "multi-phase pump" is used broadly herein to refer to any pump that is included in an application where the process stream includes entrained solids that might degrade or damage the pump if not excluded therefrom.

According to the present invention, at least two sand filters are provided, and the flow path of the process fluid is periodically switched between at least two selectable flow paths, such that each of the filters is located upstream of the pump for at least one of the selectable flow paths, where it collects sand and prevents it from entering the pump, while for at least one other of the selectable flow paths the same filter is located downstream of the pump, where the high discharge pressure of the process fluid flushes the sand out of the filter and toward the discharge pipeline, thereby returning the previously filtered sand back into the flow of process fluid, and avoiding any need of a large and complicated collection vessel, and/or any environmental impact of dumping oily sand into the environment.

Accordingly, the sand continues toward the downstream process, as is the current practice. However, unlike current practices, the sand does not flow through and damage the pump.

A first general aspect of the present invention is a system for protecting a pump from solids entrained in a process flow. The system includes a pump in fluid communication with a first filter, a second filter, and a plurality of valves, said valves being automatically controlled by a controller. The system also includes an inlet through which the process flow enters the system from an upstream source, and an outlet through which the process flow emerges from the system toward a downstream destination. The controller is configured to control said valves so as to select between at least two selectable flow paths, wherein each of said flow paths directs the process flow from the inlet to one of the plurality of filters, where the entrained solids are retained and removed from the process flow, said process flow being directed from thence through the pump, and at least part of the process flow being directed from thence to a another of the plurality of filters, where previously retained solids are purged and carried by the process flow toward the downstream destination. And the controller is configured to switch between said flow paths so as to prevent any of said filters from becoming saturated by retained solids.

In embodiments, the selectable flow paths further comprise a flow path that directs the process flow from the pump to the outlet without purging any of the filters.

In any preceding embodiment, at least one of the valves can be partially opened by the controller.

In any preceding embodiment, after flowing through the pump, the process flow can be divided into a plurality of flow streams, at least one of the flow streams being directed so as to purge one of the filters. In some of these embodiments at least one of the flow streams is directed from the pump to the outlet without purging a filter. And in any of the preceding embodiments a plurality of the flow streams can be directed so as to purge a plurality of the filters.

In any preceding embodiment, the pump can be a multiphase pump. In some of these embodiments, the multiphase pump is a twin screw multiphase pump.

In any preceding embodiment, the entrained solids can include sand. Any preceding embodiment can further include a mechanism in communication with the controller for determining quantities of entrained solids retained by each of the filters.

A second general aspect of the present invention is a method for protecting a pump from solids entrained in a process flow. The method includes providing a pump in fluid communication with a first filter, a second filter, and a plurality of valves, said valves being automatically controlled by a controller so as to select between selectable flow paths, and directing said process flow through a first of said selectable flow paths, in which the entrained solids are removed from the process flow and retained by a first of the filters upstream of the pump, and at least part of the process flow purges retained solids from a second of the filters downstream of the pump. The method further includes directing said process flow through a second of said selectable flow paths, in which the entrained solids are removed from the multiphase process flow and retained by the second filter or by a third of the filters upstream of the pump, and at least part of the process flow purges retained solids from the first filter downstream of the pump, and continuing to select between said selectable flow paths so as to prevent any of the filters from being saturated by the entrained solids.

In embodiments, the selectable flow paths further comprise a flow path that directs the process flow from the pump to the outlet without purging any of the filters.

In any preceding embodiment, at least one of the valves can be partially opened by the controller.

In any preceding embodiment, after flowing through the pump, the process flow can be divided into a plurality of flow streams, at least one of the flow streams being directed so as to purge one of the filters. In some of these embodiments, at least one of the flow streams is directed from the pump to the outlet without purging a filter. And in any of these embodiments a plurality of the flow streams can be directed so as to purge a plurality of the filters.

In any preceding embodiment, the pump can be a multiphase pump. And in some of these embodiments the multiphase pump can be a twin screw multiphase pump.

In any preceding embodiment, the entrained solids can include sand.

And in any preceding embodiment, the controller can be configured to select flow paths at least partly based on determined quantities of entrained solids retained by each of the filters.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1A:
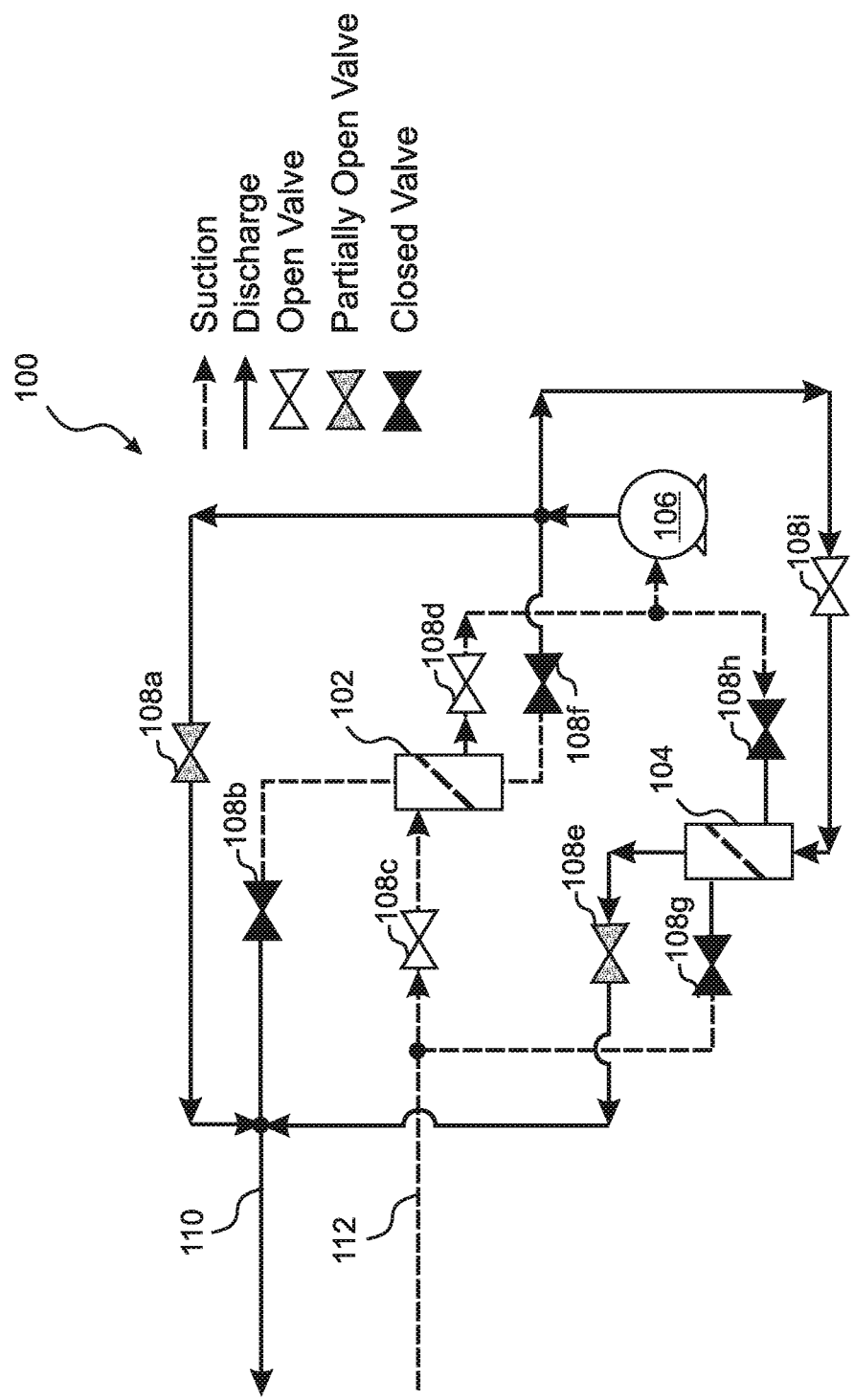
FIG. 1A is an illustration of an embodiment in which the selected flow path includes a first filter that removes solids upstream of the pump and a second filter that is purged by the process flow downstream of the pump.

With reference to FIG. 1A, the present invention is an apparatus 100 and method that uses filters 102, 104 to protect a pump 106 such as a multiphase pump from ingesting entrained solids in a process stream, referred to herein generically as "sand," while automatically purging the filters 102, 104 of sand without requiring a low pressure destination for purged sand and purging fluid. Rather than eliminating the sand from the process stream altogether, the present apparatus and method temporarily remove the sand from the process flow upstream of the pump 106, and then reinject it into the process flow downstream of the pump 106, thereby eliminating any need for a low pressure destination for sand and purging fluid.

According to the present invention, the apparatus 100 includes a plurality of filters 102, 104, and a plurality of selectable flow paths. In the embodiment of FIG. 1A, the pump 106 is a multiphase pump, two sand filters 102, 104 are provided, and the flow path of the process fluid is periodically switched between four selectable flow paths. The switching of the flow paths is under the control of a flow path controller (not shown), which is configured to open, close, or partially open different combinations of valves (108a-108i, collectively referred to as 108) included in the apparatus 100 so as to select a desired flow path.

In FIG. 1A, the valves 108 are configured to select the first flow path, such that the first filter 102 is located upstream of the multiphase pump 106, where it collects sand from the process stream as it enters the inlet pipeline 112 and prevents it from entering the multiphase pump 102, while the second filter 104 is located downstream of the multiphase pump 102, where the high discharge pressure of the process fluid flushes the sand out of the filter 104 and toward the discharge pipeline 110, thereby returning the previously filtered sand back into the flow of process fluid and avoiding any need of a large and complicated collection vessel, and/or any environmental impact of dumping oily sand into the environment. Accordingly, the sand continues toward the downstream process, as is the current practice. However, unlike current practices, the sand does not flow through and damage the multiphase pump 106.

Note that in the figure, the diagonal dashed line shown in each filter functionally represents the filter element, such that sand is filtered out of process fluid flowing horizontally from left to right through the filter 102, 104, and the sand is purged from the filter and re-enters the process flow when process fluid flows vertically upward through the filter 102, 104.

Figure 1B:
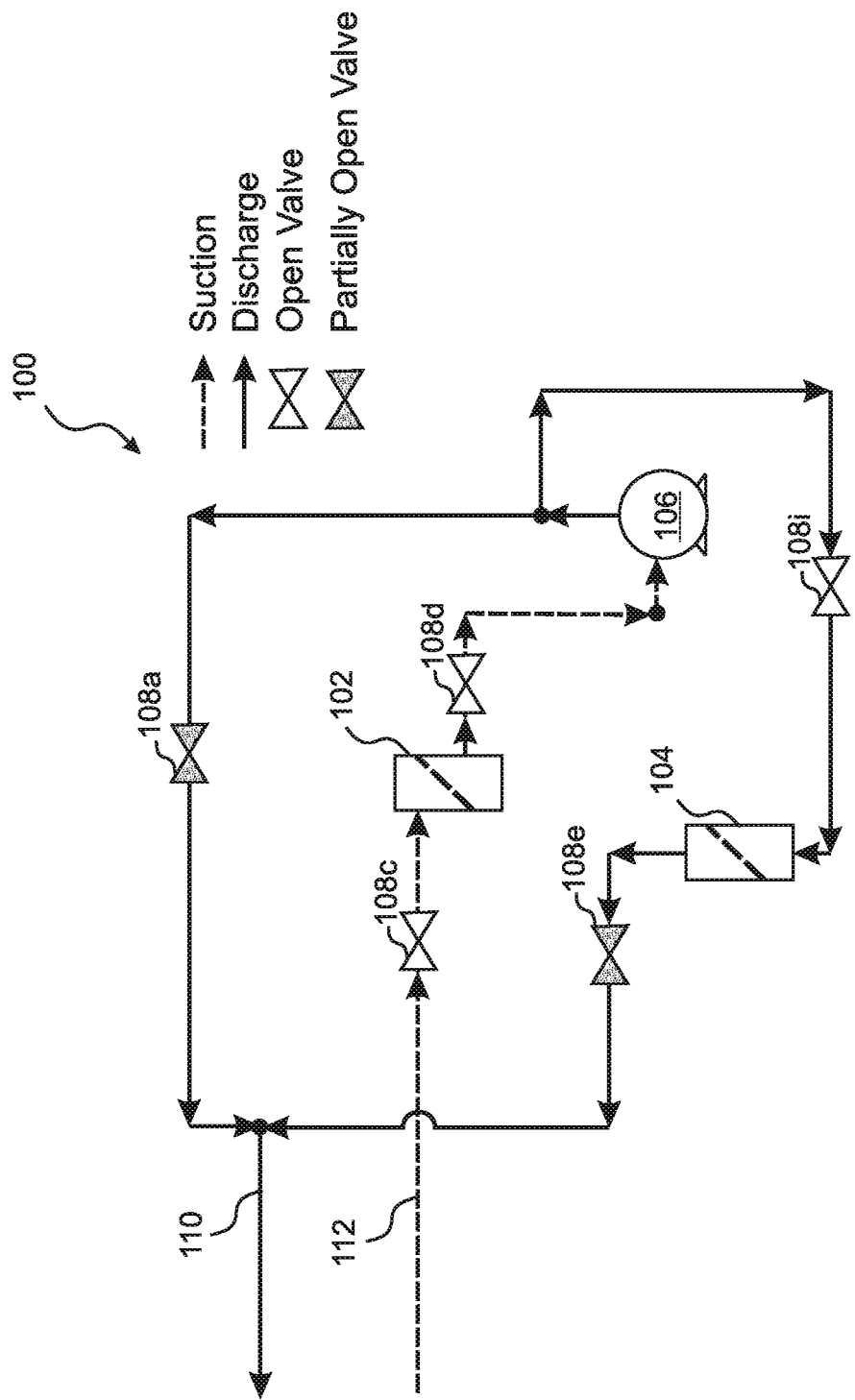
FIG. 1B is a simplified, functional illustration of the flow path of FIG. 1A, in which the closed valves and unused pipes have been removed.

FIG. 1B is a simplified illustration of FIG. 1A, in which closed valves 108 *b, f, g,* and *h* and the corresponding unused pipes have been removed for clarity of illustration. It can be seen in the figure that when this first flow path is selected, the process fluid flows from the inlet pipe 112 through the first filter 102, where any sand contained in the process flow is removed. The process fluid (with sand removed) then continues to the inlet of the multiphase pump 106. From the outlet of the multiphase pump 106, the sand-free process fluid divides into two paths toward valves 108*a* and 108*i,* according to the settings of the two partially open valves 108*a* and 108*e*. The fluid that flows through valve 108*a* continues directly to the discharge pipe 110, while the fluid that flows through open valve 108*i* purges the previously filtered sand from the second filter 104 before flowing through partially open valve 108*e* and out through the discharge pipe 110. The sand previously filtered by the second filter 104 is thereby reintegrated into the process flow downstream of the multiphase pump 106.

Figure 2A:
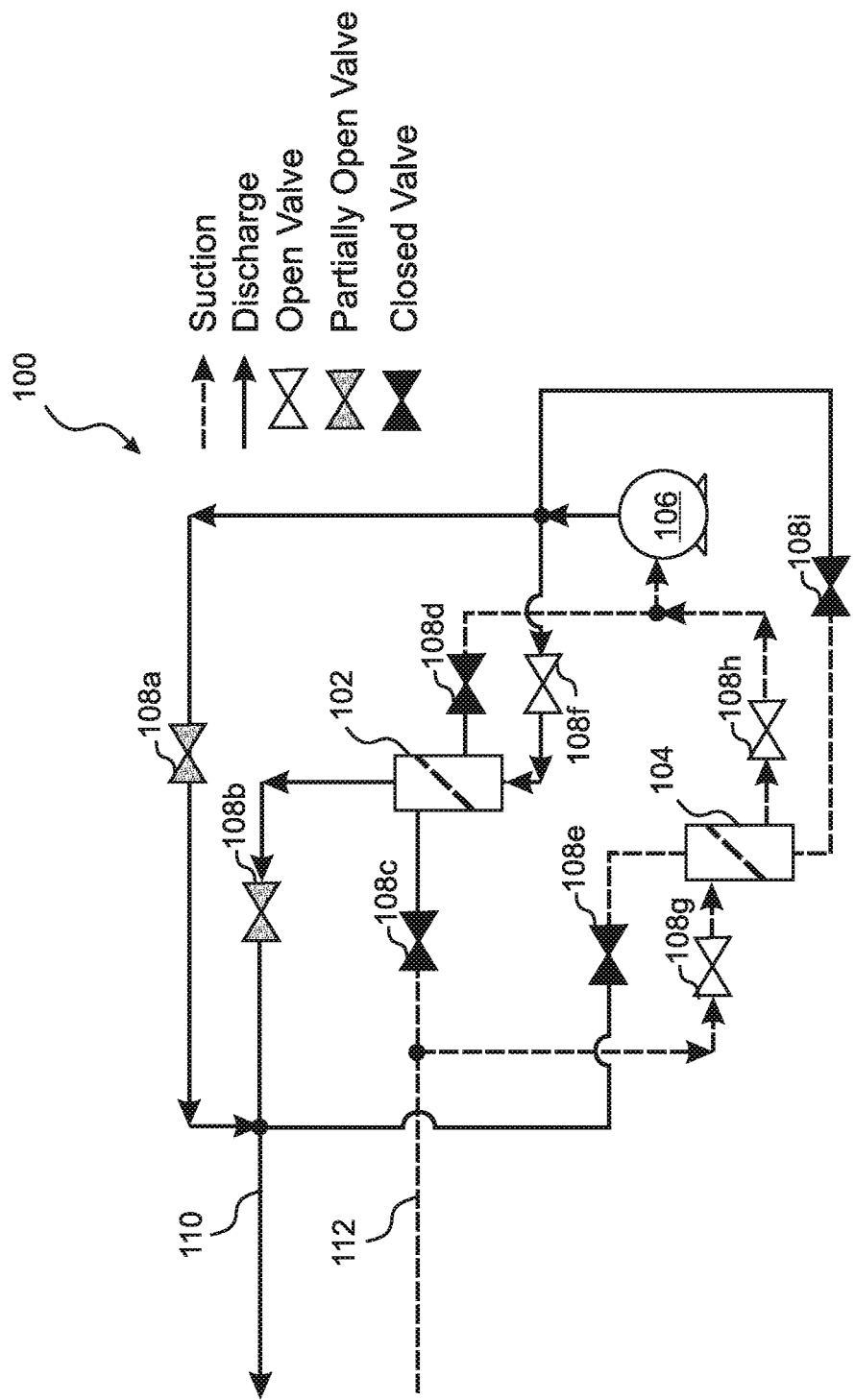
FIG. 2A is an illustration of the embodiment of FIG. 1A in which the flow path has been changed so as to cause the second filter to remove solids upstream of the pump and the first filter to be purged by the process flow downstream of the pump.
Figure 2B:
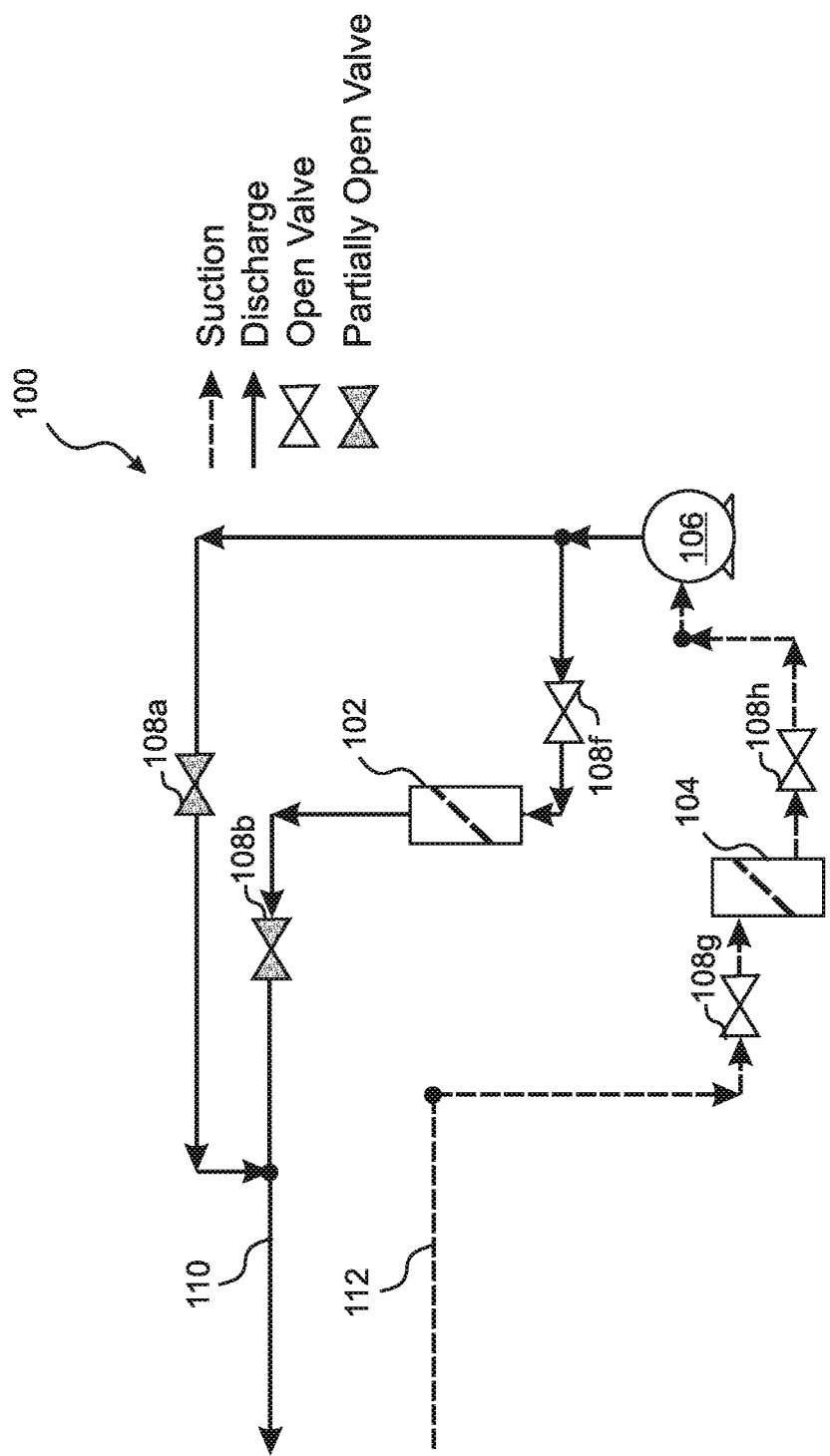
FIG. 2B is a simplified, functional illustration of the flow path of FIG. 2A, in which the closed valves and unused pipes have been removed.

FIG. 2A illustrates the embodiment of FIG. 1A, with the valves 108 configured to select the second flow path. FIG. 2B is a simplified illustration of FIG. 2A, in which closed valves, 108 *c, d, e,* and *i* and the corresponding unused pipes have been removed for clarity of illustration. It can be seen in the figures that when this second flow path is selected, the process fluid flows from the inlet pipe 112 through the second filter 104, where any sand contained in the process flow is removed. The process fluid with sand removed then continues to the inlet of the multiphase pump 106. From the outlet of the multiphase pump 106, the sand-free process fluid divides into two paths toward valves 108*a* and 108*f,* according to the settings of the two partially open valves 108*a* and 108*b*. The fluid that flows through valve 108*a* continues directly to the discharge pipe 110, while the fluid that flows through open valve 108*f* purges the previously filtered sand from the first filter 102 before flowing partially open valve 108*b* and out through the discharge pipe 110. The sand previously filtered by the first filter 102 is thereby reintegrated into the process flow downstream of the multiphase pump 106.

Figure 3A:
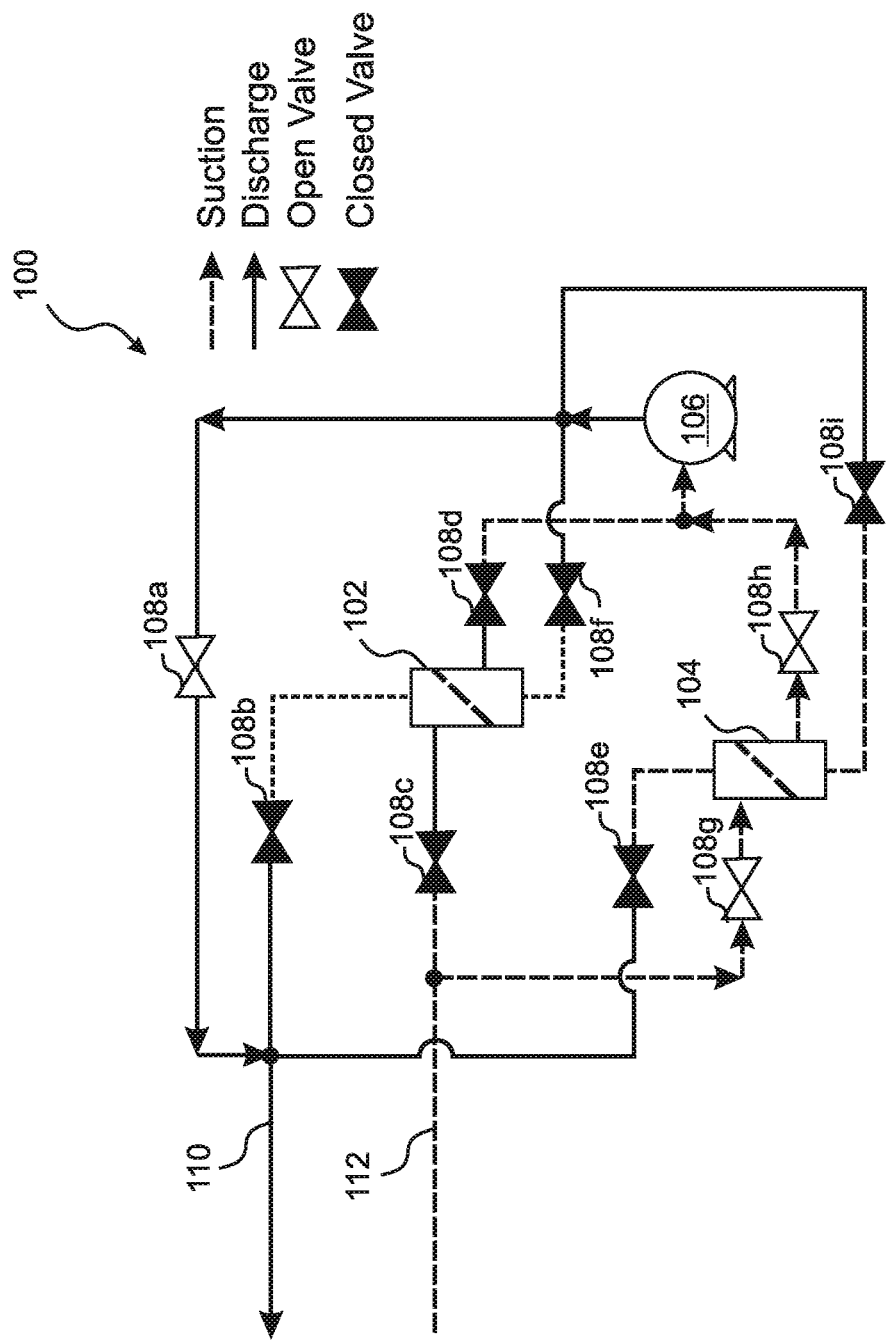
FIG. 3A is an illustration of the embodiment of FIG. 1A in which the selected flow path has been changed so as to cause the second filter to remove solids upstream of the pump and to direct the flow downstream of the pump directly to the outlet without purging any of the filters.
Figure 3B:
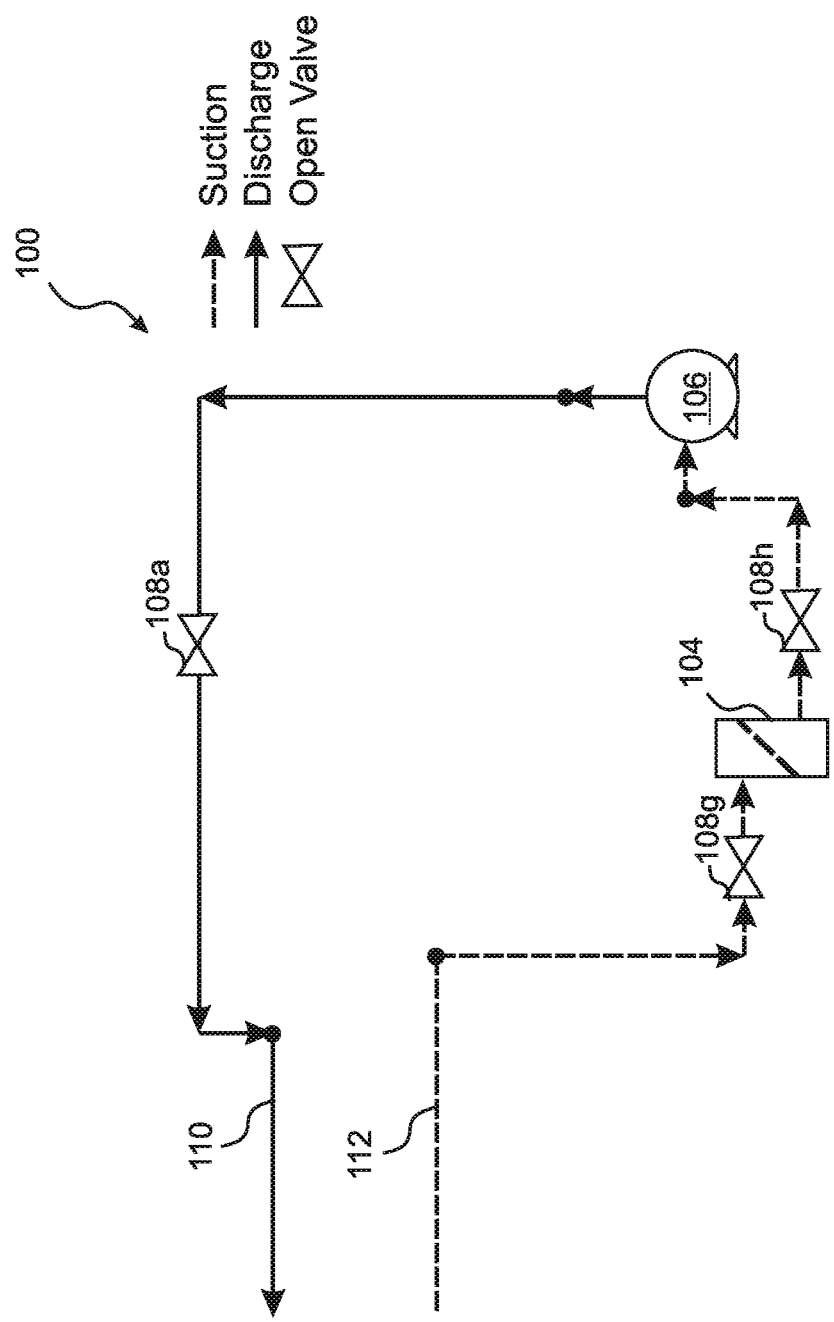
FIG. 3B is a simplified, functional illustration of the flow path of FIG. 1A, in which the closed valves and unused pipes have been removed.

FIG. 3A illustrates the embodiment of FIG. 1A, with the valves 108 configured to select the third flow path, in which neither of the filters 102, 104 is purged. FIG. 3B is a simplified illustration of FIG. 3A, in which closed valves 108 *b, c, d, e, f,* and *I* and the corresponding unused pipes have been removed for clarity of illustration. It can be seen in the figure that when this third flow path is selected, the process fluid flows from the inlet pipe 112 through the second filter 104, where any sand contained in the process flow is removed. The process fluid with sand removed then continues to the inlet of the multiphase pump 106. From the outlet of the multiphase pump 106, the sand-free process fluid by-passes both of the filters and instead flows directly to the discharge pipe 110. This path might be selected, for example, when the first filter 102 has already been purged, and the second filter 104 is not yet ready to be purged. The fourth selectable flow path, which is not illustrated, is similar to FIGS. 3A and 3B, except that the process fluid flows from the inlet pipe 112 through the first filter 102 before continuing to the multiphase pump 106.

Figure 4:
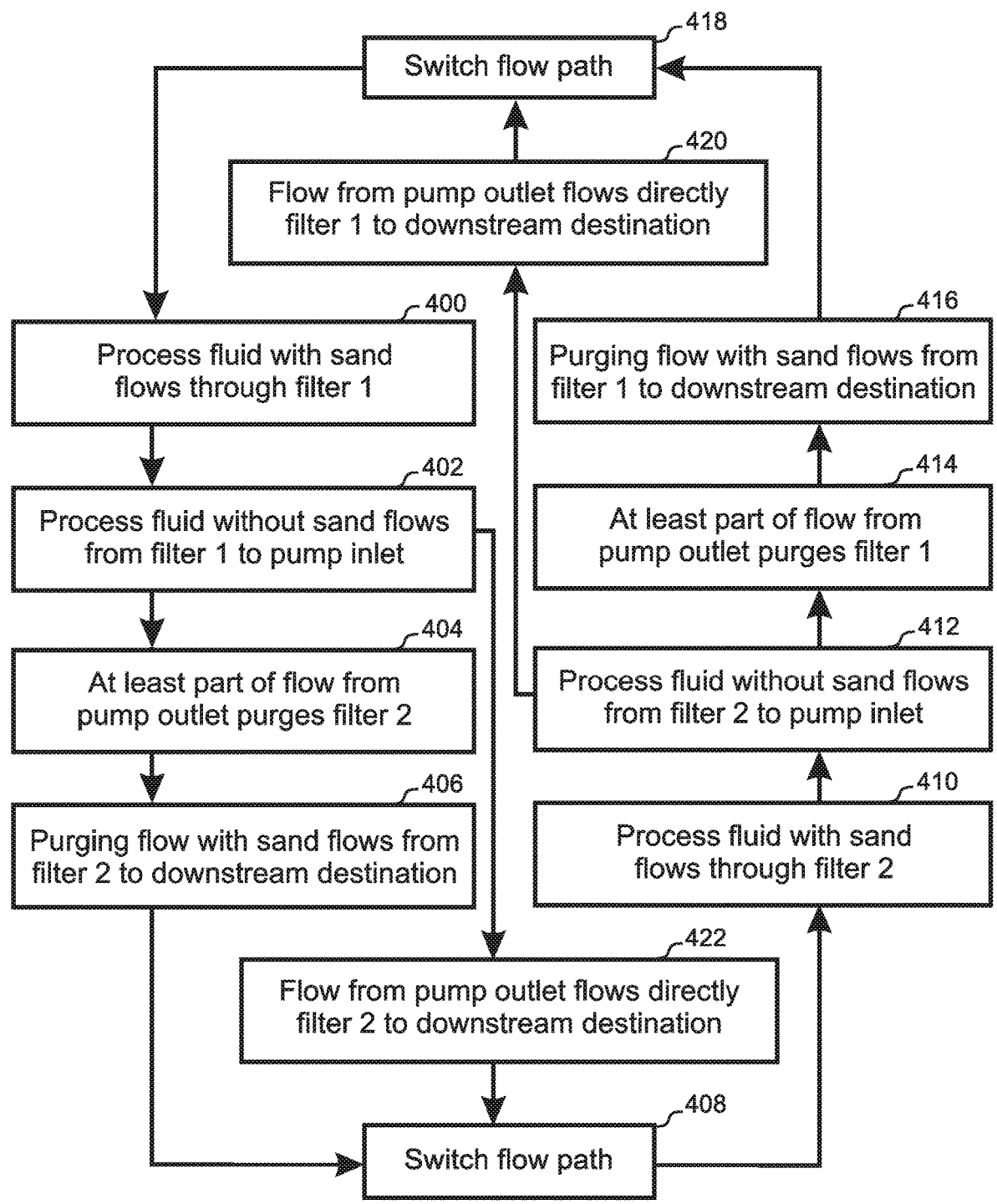
FIG. 4 is a flow diagram that illustrates a method embodiment of the present invention.

FIG. 4 is a flow diagram illustrating an embodiment of the method of the present invention. Initially, the process flow is directed from an upstream source through a first filter 400, which removes the sand from the process flow. The flow is then directed to the pump 402. At least part of the flow from the pump outlet is directed to a second filter and used to purge that filter of sand that was previously collected 404, so that the purged sand is carried by the process flow to the downstream destination 406.

After some time (and before the first filter is saturated with sand), the flow path is switched 408, such that the flow from the upstream source is now directed 410 to filter 2, which has been purged of sand and is ready to remove the sand from the inlet stream. The flow is then directed to the pump inlet 412, and from the pump outlet at least part of the flow is directed to the first filter, where it purges the first filter 414 of the sand that was collected before the flow path was switched 408 and carries the purged sand to the downstream destination 416. Sometime later, before the second filter is saturated with sand, the flow path is switched back to the first configuration 418, and the cycle begins again.

In various embodiments, the controller switches between the filters based on specified elapsed times. In other embodiments, the switching is based on measured operating parameters, such as a pressure differential across the operating filter, sand level indicators, or other measurements of the amount of sand contained in the operating filter. In some of these embodiments, when purging is not required for either of the filters, the controller channels all the discharge flow away from the pump to the downstream destination without purging any of the filters 420, 422.

The net result is that the pressure and flow of the process stream, which is induced by the pump 106, transports the sand from the upstream source to the downstream destination together with the process stream, and yet the sand is prevented from passing through the pump.

While the invention is described herein primarily with reference to multiphase pumps, and in particular with reference to twin screw multiphase pumps, It should be understood by those of skill in the art that the scope of the present invention is not limited thereto, but is applicable for protecting any pump when used in an application where the process flow includes particulate solids mixed with a liquid, and where it is desirable to exclude the particulate solids from passing through the pump.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

I claim:

1. A system for protecting a pump from solids entrained in a process flow, the system comprising:
    a pump in fluid communication with a first filter, a second filter, and a plurality of valves, said valves being automatically controlled by a controller;
    an inlet through which the process flow enters the system from an upstream source; and
    an outlet through which the process flow emerges from the system toward a downstream destination;
    said controller being configured to control said valves so as to select between at least two selectable flow paths, wherein each of said flow paths directs the process flow from the inlet to one of the plurality of filters, where the entrained solids are retained and removed from the process flow, said process flow being directed from thence through the pump, and at least part of the process flow being directed from thence to a another of the plurality of filters, where previously retained solids are purged and carried by the process flow toward the downstream destination;
    said controller being configured to switch between said flow paths so as to remove the entrained solids from the process flow upstream of the pump, and then reinject the entrained solids into the process flow downstream of the pump, thereby directing all of the process flow and entrained solids to the outlet while ensuring that the entrained solids do not enter the pump, and preventing any of said filters from becoming saturated by the retained solids.

2. The system of claim 1, wherein said selectable flow paths further comprise a flow path that directs the process flow from the pump to the outlet without purging any of the filters.

3. The system of claim 1, wherein at least one of the valves can be partially opened by the controller.

4. The system of claim 1, wherein, after flowing through the pump, the process flow is divided into a plurality of flow streams, at least one of the flow streams being directed so as to purge one of the filters.

5. The system of claim 4, wherein at least one of the flow streams is directed from the pump to the outlet without purging a filter.

6. The system of claim 4, wherein a plurality of the flow streams are directed so as to purge a plurality of the filters.

7. The system of claim 1, wherein the pump is a multiphase pump.

8. The system of claim 7, wherein the multiphase pump is a twin screw multiphase pump.

9. The system of claim 1, wherein the entrained solids include sand.

10. The system of claim 1, further comprising a mechanism in communication with the controller for determining quantities of entrained solids retained by each of the filters.

11. A method for protecting a pump from solids entrained in a process flow, the method comprising:
    providing a pumping system comprising an inlet through which the process flow enters the system from an upstream source, and an outlet through which the process flow emerges from the system toward a downstream destination, said pumping system further including a pump in fluid communication with a first filter, a second filter, and a plurality of valves, said valves being automatically controlled by a controller so as to select between selectable flow paths from said inlet to said outlet;
    directing said process flow through a first of said selectable flow paths, in which the entrained solids are removed from the process flow and retained by the first filter upstream of the pump, and at least part of the process flow purges previously retained solids from the second filter downstream of the pump;
    directing said process flow through a second of said selectable flow paths, in which the entrained solids are removed from the process flow and retained by the second filter or by a third filter upstream of the pump, and at least part of the process flow purges retained solids from the first filter downstream of the pump; and
    continuing to select between said selectable flow paths so as to remove the entrained solids from the process flow upstream of the pump, and then reinject the entrained solids into the process flow downstream of the pump, thereby directing all of the process flow and entrained solids to the outlet, while ensuring that the entrained solids do not enter the pump, and preventing any of the filters from being saturated by the entrained solids.

12. The method of claim 11, wherein said selectable flow paths further comprise a flow path that directs the process flow from the pump to the outlet without purging any of the filters.

13. The method of claim 11, wherein at least one of the valves can be partially opened by the controller.

14. The method of claim 11, wherein after flowing through the pump, the process flow is divided into a plurality of flow streams, at least one of the flow streams being directed so as to purge one of the filters.

15. The method of claim 14, wherein at least one of the flow streams is directed from the pump to the outlet without purging a filter.

16. The method of claim 14, wherein a plurality of the flow streams are directed so as to purge a plurality of the filters.

17. The method of claim 11, wherein the pump is a multiphase pump.

18. The method of claim 17, wherein the multiphase pump is a twin screw multiphase pump.

19. The method of claim 11, wherein the entrained solids include sand.

20. The method of claim 11, wherein the controller is configured to select flow paths at least partly based on determined quantities of entrained solids retained by each of the filters.

* * * * *